Figure 1:
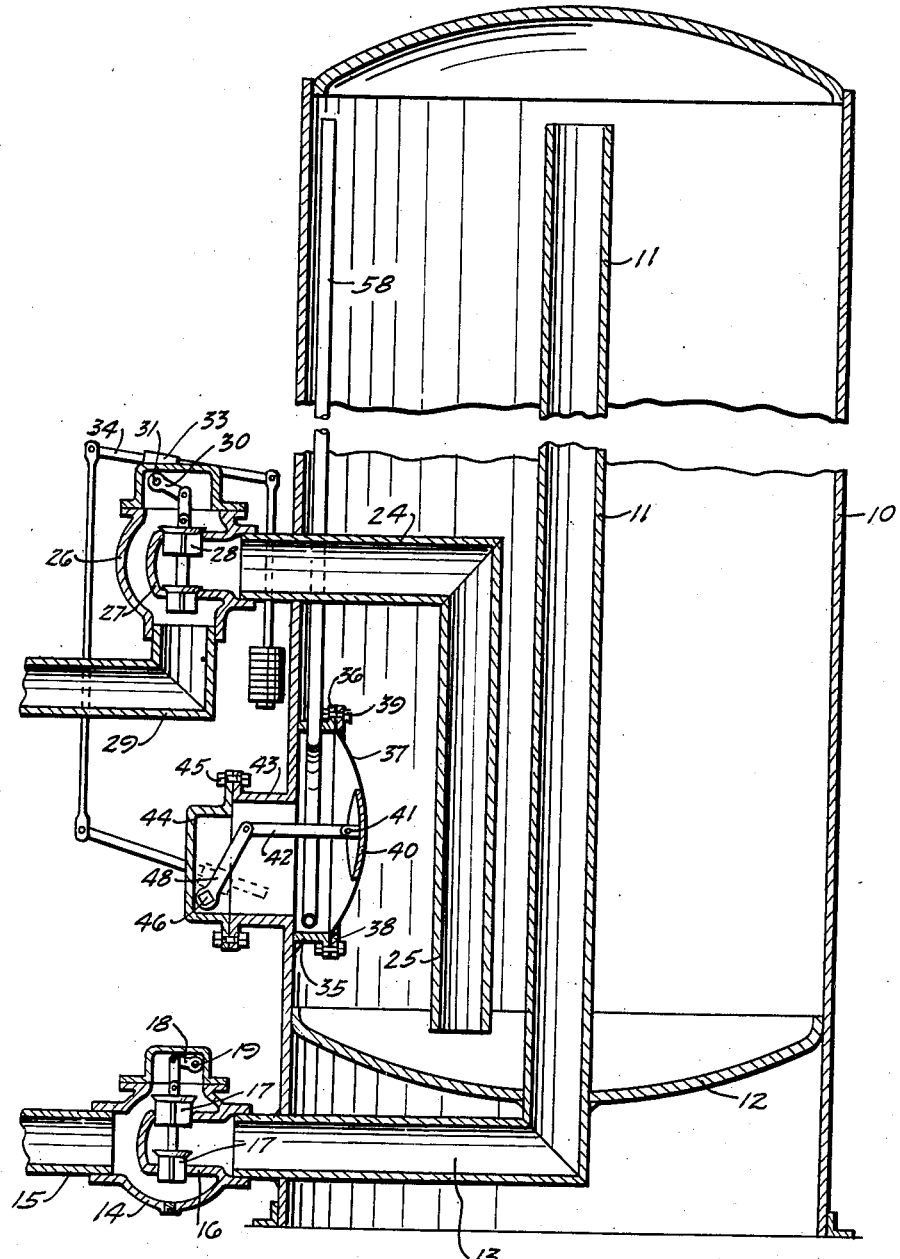

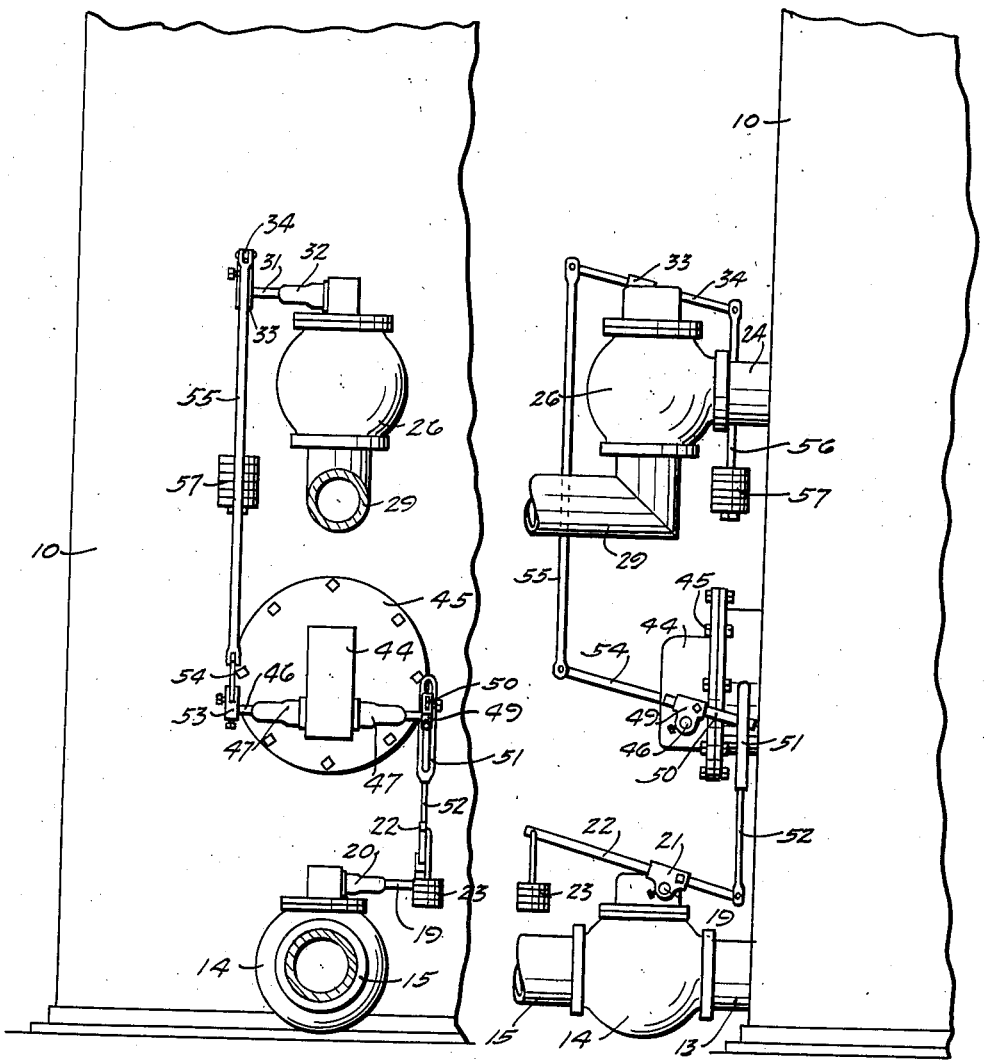

Dec. 26, 1933.        E. R. WILLIAMS        1,941,030
MEANS FOR CONTROLLING THE FLOW OF FLUIDS
Filed Dec. 5, 1930        6 Sheets-Sheet 3

Inventor
Elmer R. Williams

By        Jack A. Ashley
          Attorney

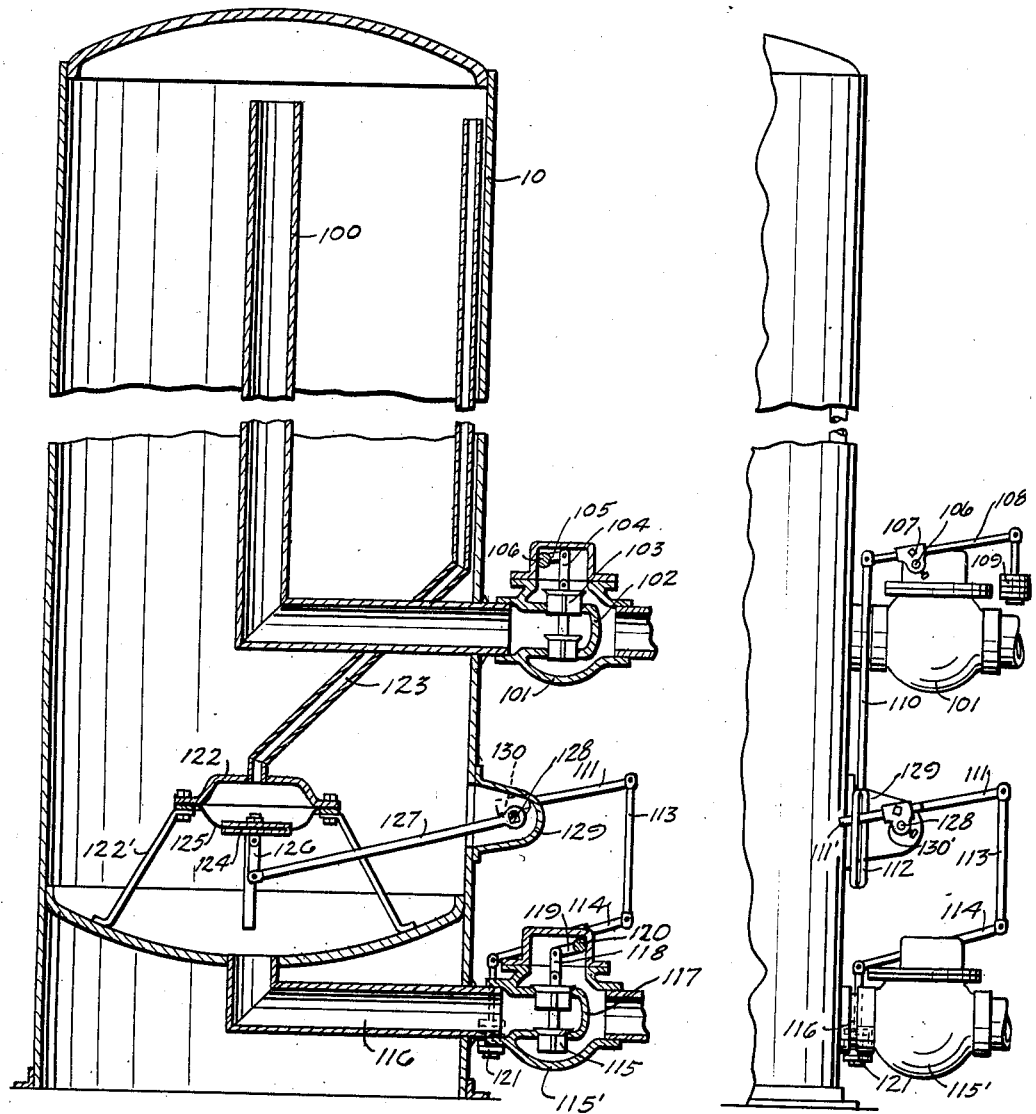

Dec. 26, 1933.  E. R. WILLIAMS  1,941,030
MEANS FOR CONTROLLING THE FLOW OF FLUIDS
Filed Dec. 5, 1930   6 Sheets-Sheet 5

Inventor
Elmer R. Williams
By
Jack A. Schley
Attorney

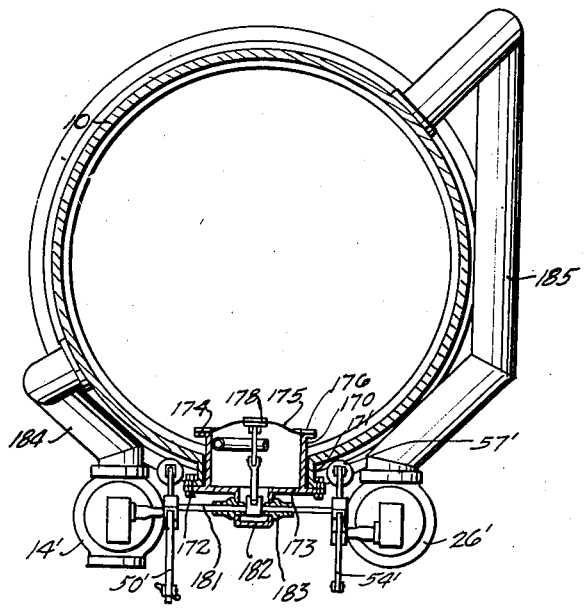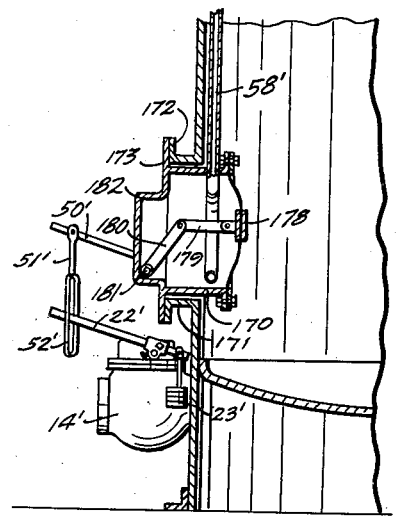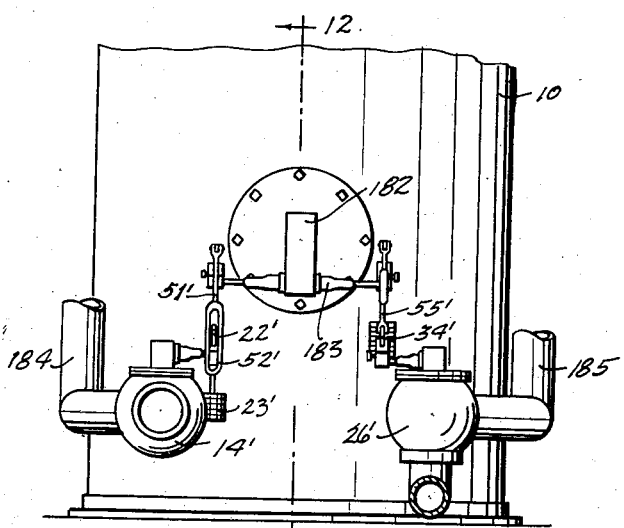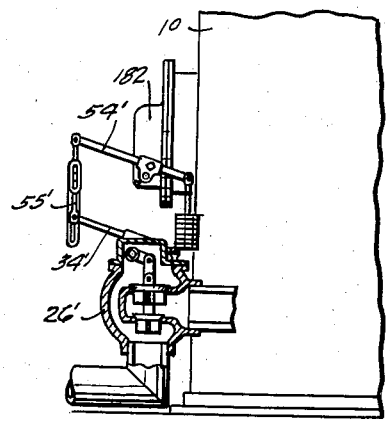

Patented Dec. 26, 1933

1,941,030

UNITED STATES PATENT OFFICE 1,941,030

MEANS FOR CONTROLLING THE FLOW OF FLUIDS

Elmer R. Williams, Tulsa, Okla., assignor to National Tank Company, Tulsa, Okla., a corporation of Oklahoma Application December 5, 1930. Serial No. 500,303

10 Claims. (Cl. 183—2.7)

This invention relates to new and useful improvements in means for controlling the flow of fluids.

One object of the invention is to provide improved means operated by the specific gravity or weight of the liquid in a receptacle (containing both liquid and gas) for effecting a dual operation of the liquid and gas discharge valves.

Another object of the invention is to provide improved means operated by variations in the specific gravity of a liquid in a container having a fluid pressure above the liquid for operating a liquid outlet valve, together with means for balancing and supporting said liquid operated means by utilizing the fluid pressure, so that the fluid pressure above the liquid and the fluid pressure in the path of the liquid operated means are equalized.

A further object of the invention is to provide improved means for maintaining a liquid level in a container, wherein the specific gravity of the liquid is utilized as an actuating force for operating outlet valves and is balanced or opposed by auxiliary means set to hold a predetermined liquid level.

Still another object of the invention is to provide controlling means wherein the specific gravity of the liquid is balanced against the gas pressure and opposed by a weight, whereby the specific gravity must overcome the weight to open the liquid outlet valve and the weight must overcome the specific gravity to close the valve. By varying the weight the liquid level in the receptacle may be varied.

A further object of the invention is to utilize the specific gravity of the liquid acting on one side of a diaphragm supported on its opposite side by the pressure of the gas to operate a valve mechanism for controlling the flow of liquid and gas from a receptacle, whereby a predetermined liquid level may be maintained in the receptacle.

A still further object of the invention is to provide means whereby fluctuations in the rise and fall of the liquid in a receptacle will operate an outlet valve for the liquid, or both an outlet valve for the liquid and an outlet valve for the gas, thus providing a dual control, whereby the operation of the liquid and gas outlet valves may be effectively controlled for the purpose of discharging liquids from the receptacle before they reach an abnormal level, as well as for the purpose of automatically taking care of extreme variations in the flow of the influent entering the tank.

Still another object of the invention is to do away with the use of a float and to provide a more positive operating means. Floats are subject to collapse, submergence in the liquid due to sticking, and for other causes frequently fail to operate.

By utilizing the direct action of the column of liquid in the tank the more liquid which flows into the tank the more positive the action, and consequently the tank cannot fill up with liquid and fail to operate the outlet valve, and thus the liquid is prevented from overflowing into the gas outlet.

Another object of the invention is to provide an improved dual control for the liquid and gas outlet valves of a receptacle, whereby the operation of the valves may be proportionately regulated, with the result that one valve may be made to open in advance of the other or to close in advance of the other, and the relative degrees of opening and closing positively controlled in a new and novel manner.

Still another object of the invention is to provide means, whereby a predetermined liquid level and a more or less constant or predetermined gas pressure may be carried in a receptacle, and also whereby an excess of gas pressure may be utilized to force out an abnormal accumulation of liquid in the receptacle.

A construction designed to carry out the invention will be hereinafter described together with other features of the invention.

Figures 4, 5:
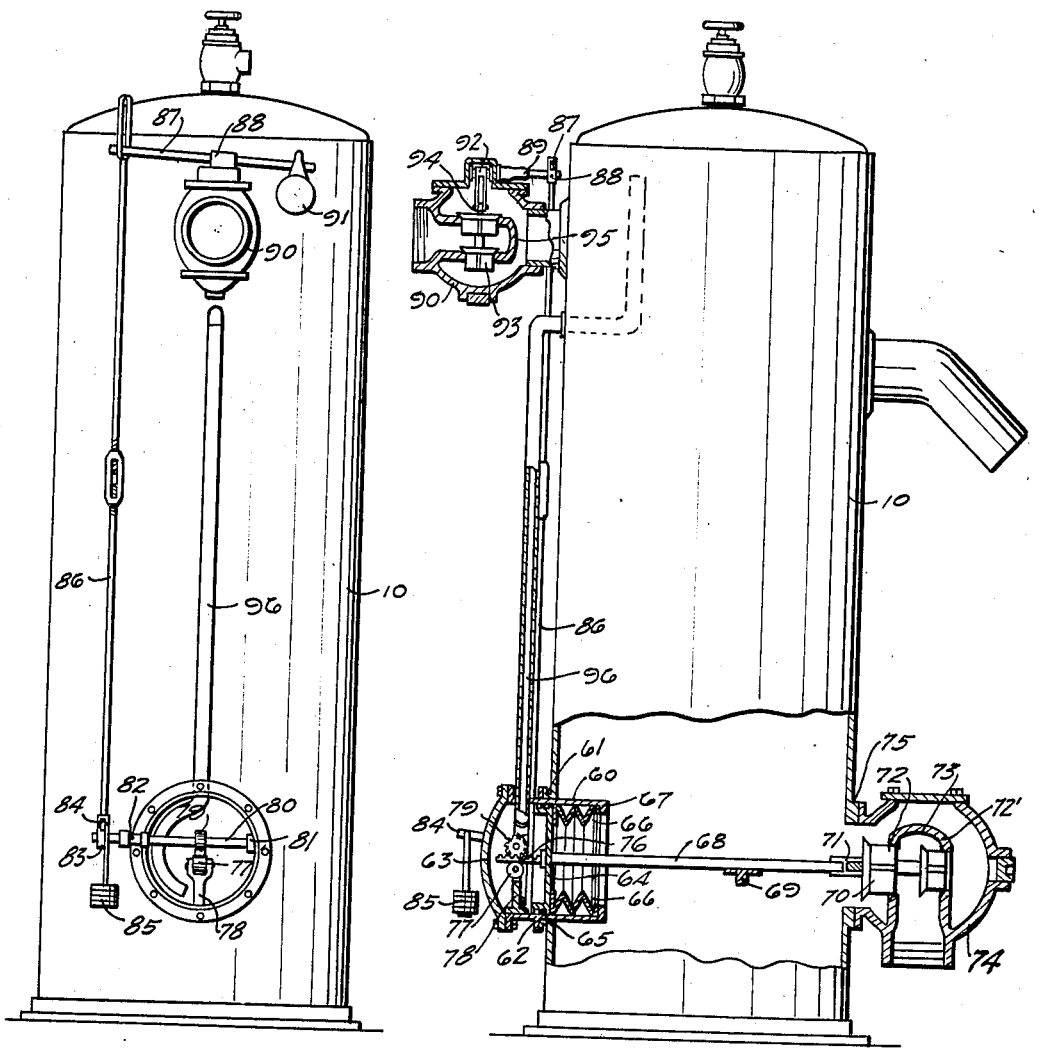
Figure 9:
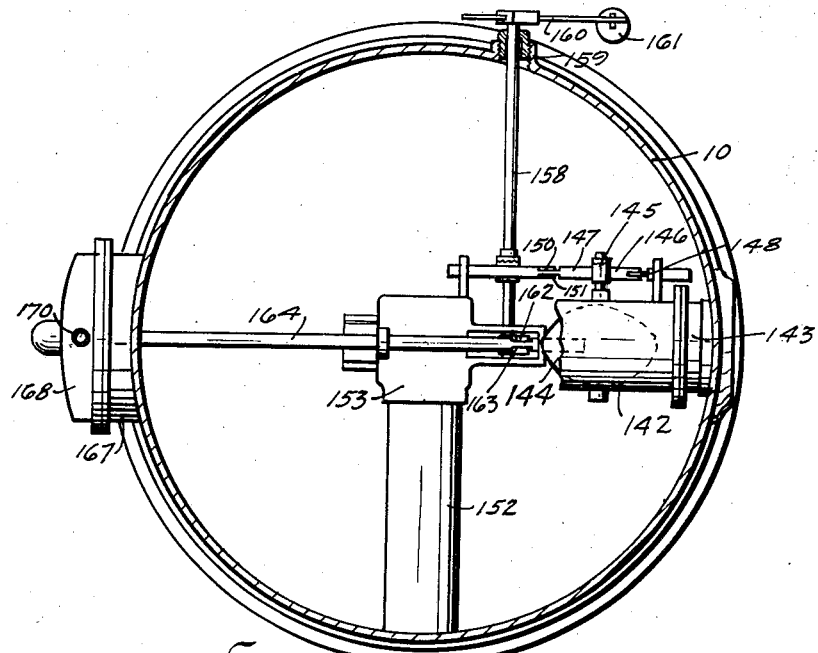
Figure 8:
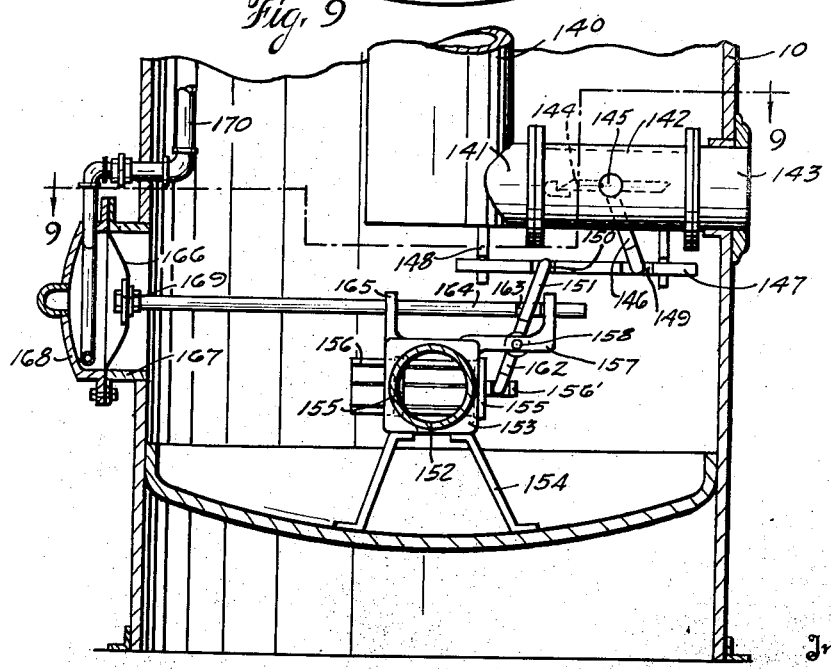

The invention will be more readily understood from a reading of the following specification and by reference to the accompanying drawings in which an example of the invention is shown, and wherein:

Figure 1 is a vertical sectional view of a separator tank equipped with controlling means constructed in accordance with the invention, Figure 2 is a front elevation of the controlling means, Figure 3 is a side elevation of the same, Figure 4 is an elevation showing another form of controlling mechanism in which the diaphragm is mounted exteriorly, Figure 5 is a view at right-angles to Figure 4, being shown partly in elevation and partly in section, Figure 6 is a vertical sectional view of another form of apparatus embodying the invention and embodying an inverted diaphragm, Figure 7 is a partial elevation of the same, Figure 8 is a partial elevation of the lower portion of a tank showing a controlling device constructed in accordance with the invention and using interior valves, Figure 9 is a horizontal cross-sectional view taken on the line 9—9 of Figure 8, Figure 10 is an elevation of the lower portion of a tank showing a twin arrangement of valves for controlling mechanism constructed in accordance with the invention, Figure 11 is a horizontal cross-sectional view of the same, Figure 12 is a vertical sectional view taken on the line 12—12 of Figure 10, and Figure 13 is a view at right angles to Figure 10, showing one of the valves in section.

This application is filed as a continuation in part of my co-pending application, Serial No. 428,159, filed February 13, 1930.

In the drawings the numeral 10 designates an upright separator tank which may be of any size and which may contain any desired form of separating elements, as the interior construction of the separator has nothing to do with the invention. As there are several ways in which the invention may be carried out, some of the various structures have been shown in the drawings and will be hereinafter described, but the invention is not to be limited to such forms which are merely examples of satisfactory arrangements.

In Figures 1, 2 and 3, I have shown a gas discharge pipe 11 extending vertically in the tank 10 and projecting through the false bottom 12 of the tank. A lateral pipe 13 extends from the bottom of the pipe 11 through the side of the tank and is connected into one side of a gas valve casing 14 from the other side of which a gas pipe 15 extends. The gas valve is of the usual construction common in this art and forms no particular part of the invention. It is known as a double valve having therein a bonnet 16 carrying the valve seats for the valves 17, which are suspended in the usual manner from the crank 18, as is shown in Figure 1.

The crank is fastened on a rock shaft 19 extending through a packing box 20, as is shown in Figure 2. On the outer end of the shaft is fastened a collar 21 which has a lever 22 adjustably secured therein. From one end of the lever weights 23 are suspended and these weights counterbalance the valves, as will hereinafter be described.

An oil discharge pipe 24 extends through the side of the tank and a vertical oil discharge pipe 25 depends from the inner end of the pipe 24 within the tank so that its entrance end is just above the bottom 12. The outer end of the pipe 24 is fastened into the casing 26 of an oil outlet valve similar to the valve 14. The casing 26 has a bonnet 27 connected with the pipe 24 and carrying the valve seats for receiving the valves 28. These valves are not balanced, the lower one being smaller and this permits the gas pressure to unseat the valves. A discharge pipe 29 leads from the bottom of the casing. The valves are suspended from the end of a crank 30 fastened on the end of a rock shaft 31 within the casing. The shaft 31 extends through a stuffing box 32 and has a collar 33 fastened on its outer end in the usual manner. The collar 33 receives a lever 34 which with the lever 22 is connected with the operating means to be hereinafter described.

It will be seen that so long as the valves 28 are closed no oil can escape from the tank and a predetermined oil level may be carried. The valves 17 are shown in Figure 1 as partially opened. This permits a limited escape of gas from the pipes 11 and 13. It is obvious that if the gas valves were set to carry a pressure of twenty-five pounds in the separator, an excessive gas pressure in the tank could not be relieved unless the valves were further opened, and also that if the gas valves are entirely closed any desired gas pressure (within safe limits) may be built up in the tank. By arranging the oil valves 28 to open in advance of any change in the position of the gas valves, an excess of oil in the tank may be discharged without disturbing the adjustment of the gas valves or altering the gas pressure. Should the oil rise to an excessive height the gas valve would be further closed to build up more gas pressure to expel the oil.

It will be noted by observing Figures 1 and 3, that when the lever 22 is rocked in a counter-clockwise direction the gas valves 17 will be closed and when the lever 34 is likewise rocked the oil valves 28 will be opened, the said levers extending in opposite directions. Automatic means for operating these valves form the basis of this invention.

Within the separator tank 10 a short distance above the bottom 12, a collar 35 is secured to the wall in any suitable manner. This collar is provided with an annular outwardly directed flange 36 to which a circular diaphragm 37 is secured by a retaining ring 38 and bolts 39. The outer side of the diaphragm is exposed to the oil or liquid in the tank, the diaphragm being located below the oil level.

A plate 40 is secured to the central portion of the inner side of the diaphragm and has an ear 41 pivoted to one end of a link 42, which extends into a flanged sleeve 43 secured in the side of the tank. A flanged cap 44 is secured to the outer end of the sleeve by bolts 45. A rock shaft 46 extends through the cap and also through stuffing boxes 47 on each side of said cap. A crank arm 48 fastened on the shaft is pivoted to the outer end of the link 42.

It will be seen that when the diaphragm 37 is displaced outwardly or to the left, the crank arm will be swung in a counter-clockwise direction (Figure 1), thus likewise rocking the shaft 46. As is shown in Figures 2 and 3, a collar 49 is fastened on the shaft 46. A lever 50 longitudinally adjustable in said collar projects into an elongated loop 51 connected at its lower end with a rod 52, which is in turn pivoted at its lower end to the lever 22 of the gas outlet valve 14.

On the opposite end of the shaft 46 a collar 53, similar to the collar 49, is adjustably mounted and a lever 54 is adjustably fastened in said collar. A link 55 has its lower end pivoted to the outer end of the lever 54 while its upper end is pivoted to the outer end of the lever 34 of the oil discharge valve 26. A rod 56 depending from the inner end of the lever 34 supports counter-balancing weights 57.

Within the tank 10 a vertical pipe 58 extends from the collar 35 to the top of the tank where the gas chamber is located. This pipe admits gas to the chamber formed by the collar 35, sleeve 43 and cap 44 on the outer side of the diaphragm 37. The gas pressure on top of the oil within the tank will be the same as the gas pressure on the outer side of the diaphragm by reason of the pipe. A vital point in the invention is the exposing of the entire outer surface of the diaphragm to direct and intimate contact with the column of liquid in the tank. By this arrangement the specific gravity of the liquid is exerted directly against substantially the entire outer surface of the flexible portion of the diaphragm, while the fluid or gas pressure is exerted against the inner side.

It will be seen that the weights 57 will resist the outward displacement of the diaphragm 37 by the specific gravity of the liquid within the tank. Whenever the specific gravity or weight is increased by an excess of liquid within the tank above the normal level, and this increase is sufficient to overcome the weights 57, the diaphragm 37 will be displaced outwardly and the shaft 46 thus rocked. When the shaft 46 is rocked the levers 50 and 54 will be rocked in a counter-clockwise direction. Owing to the loop 51, the lever 22 of the gas valve 14 will not be disturbed during the initial swing of the lever 50, but the lever 34 will be swung from the inception of the rocking of the shaft 46.

From the foregoing it will be seen that an excess of liquid, such as oil, in the tank 10 will cause the oil valves 28 to open and release this excess without disturbing the adjustment of the gas valves 17. When the gas valves 17 are partially open, as shown in Figure 1, they will be so held by the pressure of the gas which is escaping through the pipes 11 and 13. This pressure will be sufficient to overcome the counter-balancing weights 23. Whenever this pressure drops below the predetermined point, the said weights 23 will swing the lever 22 and close the gas valves until the pressure is again built up in the tank. By adding or removing weights, the operation of the valves 17 may be controlled.

It is customary in oil and gas separators for which this control is particularly designed, to set the gas valve so that it will not open except at a pressure considerably higher than is ordinarily necessary to force out the oil through the outlet valve. This is done so that should the well head, sufficient gas pressure will be present in the tank to force out the excess of oil. There are conditions under which even this excess of gas pressure may cause a failure, such as when the oil is cold and stiff in cold climates and does not run freely, or where considerable sand collects in the pipes and partially fills them. To carry this excess pressure is very undesirable because it results in a greater agitation of the oil under normal conditions and escapes with the oil into the storage tanks. The more the oil is agitated, the greater is the loss of gaseous vapors and the more the grade of the oil is reduced.

By the use of the control herein set forth, it is only necessary to carry about one-third the gas pressure in the tank as is ordinarily employed and further because of the positive operation, pipes of smaller diameters may be used. As before explained, the oil level in the tank may rise to a certain extent without disturbing the adjustment of the gas valves 17, but causing the oil valves 28 to open. The maintained gas pressure in the tank will be sufficient to force out the excess of oil and restore the normal level.

However, should the well head up so as to produce an excess of oil above a normal flow, not only would the valves 28 be further opened, owing to the increase in the specific gravity within the tank, but the continued rocking of the shaft 46 would cause the lever 50 to engage the top of the loop 51 and further close the gas valves 17. The result would be that additional gas pressure would be built up within the tank sufficient to force out the abnormal amount of oil.

On the other hand, if the excess in the tank was gas and not oil, it would overcome the counter-balancing weights 23 and further open the valves 17 without disturbing the oil valves, and thus relieve the excessive gas pressure. This arrangement permits a minimum amount of gas pressure to be carried in the tank at all times and the control is entirely automatic in its operation. It often happens that the gas pipe 15 is connected with a gasoline plant and a vacuum is pulled through said pipe. It is quite common to use floats for operating the oil outlet valve and a tendency of the suction created by the vacuum is to raise the oil level in the tank with the result that the oil level rises to the point where it overflows into the gas outlet pipe, which is not only detrimental but dangerous, and results in great losses at the gasoline plant. This cannot happen where the controls herein described are used.

Experiments and numerous physical tests have demonstrated that the entire area of the flexible portion of the diaphragm 37 must be exposed to direct contact with the liquid or oil in the tank, otherwise the device will not be quickly responsive and variations in the liquid level will not result in the desired operation of the valves. In dealing with oil wells where the volumes and pressures undergo exceptionally wide variations, a valve control must not only be positive in its operation, but it must respond instantly. It is pointed out that while the gas pressure in the tank and the gas pressure on the outer side of the diaphragm will be equalized, the inner side of the diaphragm will be exposed to the specific gravity of the column of oil standing in the tank and this force, as applied to the outer surface of the diaphragm, will not be as responsive where the oil contacts with the diaphragm after passing through a restricted opening, as where it is applied directly to the entire surface of the diaphragm without going through a restricted opening. Where the normal level of the oil is on a line with the center of the diaphragm, it will be seen that oil rushing into the tank will exert its force directly against the upper half of the diaphragm (Figures 1 and 5) and thus give a snap or quick action, which could not be obtained if the oil was first passed through a restricted opening before contacting with the diaphragm.

In Figures 4 and 5, I have shown a piston type of controlling means which is mounted exteriorly of the tank. A cylindrical sleeve 60 is inserted in the manhole 61 and has an annular exterior flange 62, whereby it is bolted to the flange in the manhole. The outer end of the sleeve is closed by a crowned cap 63, while the inner end of the sleeve projects into the tank 10. A piston 64 having rings 65 has a snug sliding fit in the cylinder. A bellows 66 has its inner end attached to the piston and its outer end secured to an annular flange 67 projecting inwardly from the inner end of the cylinder.

A valve rod 68 is attached at one end to the inner side of the piston. This rod rests on a cross support 69 in the tank. The opposite end of the rod is connected with a liquid discharge valve 70 by means of a pivoted link 71. The valve is of the double head type engaging vertical seats 72 and 72' in a bonnet 73 within a valve case 74. The case is connected to a flanged opening 75 in the lower side of the tank. Liquid is discharged from the bottom of the bonnet.

On the outer side of the piston is fixed a rack bar 76 supported on a guide roller 77 mounted in a pedestal 78. The rack meshes with the underside of a pinion 79 fastened on a transverse shaft 80 having one end journaled in a bracket 81 in one side of the sleeve 60 and extending through a stuffing box 82 on the opposite side. On the outer end of the shaft outside the sleeve is adjustably mounted a collar 83. A lever 84 is adjustably mounted in the collar.

When the piston 64 is displaced outwardly by the specific gravity of the liquid in the tank 10, the pinion 79 is revolved in a clockwise (Figure 5) direction, which rotates the shaft and swings the lever 84. Counterbalancing weights 85 are suspended from the outer end of the lever, while the inner end of the lever is pivoted to the lower end of a pitman rod 86, which in turn has a loop 86' on its upper end for receiving one end of a lever 87. The lever 87 is mounted in a collar 88 secured to the rock shaft 89 of a valve case 90. A balancing weight 91 is secured on the opposite end of the lever 87. The gas outlet valve is of the usual type including a crank 92 from which valves 93 are suspended by a link 94. The valves engage seats in a bonnet 95.

There is a loose connection between the rod 86 and the lever 87 to permit a limited independent movement of these parts. The weight 91 acts to hold the valves 93 open to a sufficient extent to carry a pre-determined gas pressure in the tank and this may be varied by adjusting said weight. When the piston 64 is moved outwardly and the lever 84 rocked, the rod 86 will move a limited distance without rocking the lever 87. By this arrangement the valve 70 may be opened to discharge liquid without disturbing the gas outlet valves 93, but upon continued movement of the piston 64 the gas valves 93 would be fully closed.

A tubular conductor or pipe 96 extends from the lower side of the sleeve 60 up the outside of the tank and enters the latter below the valve case 90. The upper end of the pipe terminates at the top of the tank. Gas admitted to this pipe is conveyed to the sleeve 60. This gas being under pressure equalizes the fluid pressure in the path of the piston with the fluid pressure above the liquid. The counter weight 85 must be overcome by the specific gravity of the liquid to open the valve 70.

Figures 6 and 7 illustrate another structure involving the invention. The tank 10 has a central gas pipe 100 extending through the wall of the tank below its mid-height and entering an exterior valve case 101 and particularly the bonnet 102 thereof. Gas valves 103 seating in the bonnet are suspended from a link 104 hanging from a crank 105. The crank is carried by a shaft 106 extending through the hood of the valve case. A collar 107 is mounted on the shaft and carries a lever 108 from one end of which weights 109 are suspended. A pitman rod 110 is pivoted to the other end of the lever.

An operating lever 111' has one end engaging in a loop 112 on the lower end of the rod 110, while a link 113 pivoted to the outer end of a lever 111 is pivoted at its lower end to the outer end of a lever 114. The lever 114 operates liquid outlet valves 115. A liquid discharge pipe 116 leads from the bottom of the tank 10 and enters the bonnet 117 of the valve case 115'. The valves 115 are of the usual type seating in the bonnet and suspended by a link 118 from a crank 119 extending from a rock shaft 120 journaled in the hood of the case 115'. The shaft is connected to the lever 114. Counterweights 121 are also suspended from the lever 114.

When the operating shaft 120 is rocked the valves 115 will be opened and the lever 111' has swung a limited distance in the loop 112 the rod 110 will be pushed upwardly, thereby closing the valves 103. This operation is the same as that of the valves 17 and 28.

Within the tank a small dome or cap 122 is supported above the bottom of said tank upon legs 122'. A gas pipe 123 leading from the top of the tank enters the top of the dome to supply gas under pressure to a diaphragm 125 secured to the under side of said dome. A pair of disks 124 clamped to opposite sides of the diaphragm support a pivoted link 126. The lower end of the link is pivoted to the inner end of an elongated lever 127 fastened on a shaft 128. The shaft is journaled in a bonnet 129 secured to the side of the tank.

The levers 111 and 111' are fastened in collars 130 and 130' which are secured on the ends of the shaft 128. The gas pressure in the dome holds the diaphragm 125 extended. When the specific gravity of the liquid, acting upon the entire surface of the diaphragm, displaces the latter upwardly, it must overcome the weights 121. The operation of the valves is the same as in the other forms and further explanation is considered unnecessary.

Figures 8 and 9 show an internal valve structure made in accordance with the invention. A gas riser 140 in the center of the tank 10 has a discharge elbow 141 at its bottom connected to a valve case or sleeve 142, disposed horizontally and connected to a nipple 143. A butterfly valve 144 is mounted in the sleeve on a shaft 145. The shaft extends through the sleeve and has a depending lever 146 adjustably mounted thereon.

A detent or slide bar 147 is mounted in hangers 148 depending from the bottoms of the elbow 141 and the sleeve 142. The bar has an elongated shank 149 receiving the forked end of the lever 146, whereby the bar may slide a limited distance without swinging the lever 146. The bar has a second shank 150 receiving the upper forked end of a lever 151.

A liquid outlet pipe 152 extends horizontally at right angles to the sleeve 142, through the wall of the tank. A valve case 153 supports the inner end of the pipe. The case is supported on legs 154 at the center of the tank. Valves 155 engage seats in the vertical sides of the case and are connected by a guide spider 156. A bracket 157 on the case has one end of a transverse shaft 158 journaled therein. This shaft extends through a stuffing box 159 on the outside of the tank as is shown in Figure 9. A lever 160 fastened on the outer end of the shaft supports a counterbalancing weight 161.

The lever 151 is mounted on this shaft and operates the bar 147. A valve lever 162 is centrally fastened on the shaft. The lower end of the lever 162 is forked and engages a shank 156' on the valve guide 156. The upper forked end of the lever engages the shank 163 of a slide bar 164. This bar is supported in the bracket 157 and a support 165. When the bar 164 is slid inward toward the center of the tank the valves 155 will be closed and the valve 144 opened.

A diaphragm 166 is clamped in a manhole collar 167 by a crowned cap 168. Disks 169 clamped on the diaphragm are secured to the bar 164. A gas pressure pipe 170 leads from the cap into the tank and up the same to the gas space at the top. The gas pressure supports and the weight 161 opposes the displacement of the diaphragm by the liquid. When these influences are overcome by the specific gravity of the liquid the bar 164 will be slid outwardly, thus swinging the lever 162 in a counter-clockwise direction. This not only opens the valves 155 to discharge liquid through the case 153 and pipe 152, but rocks the shaft 158. The rocking of the shaft swings the lever 151, whereby the bar 147 is slid. After a limited sliding of this bar the lever 146 is swung, thereby operating the butterfly valve 144. The valve 144 is closed as the valves 155 are fully opened.

Figures 10 to 13 inclusive illustrate another form which is particularly adapted to be applied to an ordinary oil and gas separator such as is used at oil wells. A control drum 170 is inserted in the usual manhole collar 171 of the tank 10. This collar has a flange 172 and the drum has a circular front plate 173, similar to the usual manhole cover, which is bolted to said flange. The drum projects into the tank and has an inner annular flange 174 (Figure 11) to which a diaphragm 175 is secured by a ring 176.

A pair of disks 178 are clamped to the diaphragm and one end of a link 179 is pivoted to the disks, while the other end is pivoted to a crank 180 fastened on a rock shaft 181 journaled in a bonnet 182 on the front plate 173. The shaft extends through stuffing boxes 183 on each side of the bonnet.

A gas pipe 184 is connected to the tank in the usual manner and an oil outlet pipe 185 is connected to said tank in a like manner. These pipes are directed forwardly and shaped to connect one with a gas valve case 14' and the other with an oil valve case 26' on each side of the drum 170. These valves operate like the valves 17 and 28 (Figures 1, 2 and 3) and a detailed description is considered unnecessary.

The shaft 181 carries a lever 50' on one end and a lever 54' on its opposite end. The lever 50' has a depending rod 51' pivoted to its outer end. A loop 52' at the lower end of the rod receives the lever 22' of the gas valve. Weights 23' are suspended from the opposite end of the lever 22' and the operation is identical with the valves 17 of Figures 1, 2 and 3.

The lever 54' carries counterbalancing weights 57' like the lever 54 of Figures 1, 2 and 3. This lever is connected by a link 55' with the lever 34' of the oil valve case 26', the operation being identical with the valves 28. A gas pressure pipe 58' leads from the top of the tank to the drum 170. The operation is so obviously like the form shown in Figures 1, 2 and 3 that further description is considered useless.

From the foregoing description it will be readily seen that with a device of the type embodying the present invention the constant separation of gas and oil may be accomplished without requiring the attention of an attendant, the actuation of the separating mechanism being entirely automatic, depending upon the opposing pressures created in the tank by the oil and gas which flows thereinto.

Various changes in the size and shape of the different parts, as well as modifications and alterations, may be made within the scope of the appended claims.

Having illustrated and described preferred forms of the invention, what I claim, is:

1. In a dual control device for separators, an upright tank having an influent inlet above its bottom, a liquid outlet valve connected with the bottom portion of the tank, a gas outlet valve connected with the upper portion of the tank, a vertical diaphragm mounted at the side wall of the tank and having the major portion of one side entirely open to the interior of said tank, whereby the influent liquid may immediately contact said side of the diaphragm at different elevations and instantly displace the same, a gas chamber on the opposite side of the diaphragm, a conductor for conveying gas from the tank to said gas chamber, a rock shaft in the gas chamber, a crank connection between the rock shaft and the diaphragm, a link connection between the rock shaft and the gas valve, and a second link connection between the rock shaft and the liquid valve, and a weight for resisting operation of the shaft by the diaphragm.

2. In a dual control device for separators, an upright tank, a liquid outlet pipe leading from the tank, a liquid outlet valve connected to the liquid outlet pipe, a gas outlet pipe leading from the tank, a gas outlet valve connected to the gas outlet pipe, a diaphragm carried by the tank above the bottom thereof and having one side unobstructed and exposed to the liquid rising in the tank and located to be immediately contacted and impacted by the liquid entering the tank, a conductor for carrying gas from the tank to the opposite side of the diaphragm, and valve operating means connected with the liquid outlet valve and with the gas outlet valve engaged by the diaphragm, the diaphragm being arranged to be displaced solely by the weight of the liquid to open the valves.

3. In a dual control device for separators, an upright tank, a liquid outlet pipe leading from the tank, a liquid outlet valve connected to the liquid outlet pipe, a gas outlet pipe leading from the tank, a gas outlet valve connected to the gas outlet pipe, a diaphragm carried by the tank above the bottom thereof and having one side unobstructed and exposed to the liquid rising in the tank and located to be immediately contacted and impacted by the liquid entering the tank, a conductor for carrying gas from the tank to the opposite side of the diaphragm, valve operating means connected with the liquid outlet valve and with the gas outlet valve engaged by the diaphragm, and means for holding the gas outlet valve under restraint against the gas pressure in the tank, whereby a predetermined gas pressure may be maintained in the tank.

4. In a dual control device for separators, an upright tank having an inlet, a liquid outlet valve connected with the tank, a gas outlet valve connected with the tank, a diaphragm carried by the tank and having one side in contact with the liquid collected in the tank, means for conveying gas from the tank to the opposite side of the diaphragm, a movable valve operating member engaged by the diaphragm, operating means for the valves connected with said member, and a swinging weight connected with the operating member for resisting the displacement of the diaphragm by the liquid.

5. In a dual control device for separators, an upright tank, a diaphragm carried by the tank and having the major portion of one side exposed to the interior of the tank for intimate contact with the liquid in the tank, a gas chamber on the opposite side of the diaphragm, means for conducting gas from the tank to the chamber, a gas outlet valve above the diaphragm and a liquid outlet valve below the diaphragm, a rock shaft, means for rocking said shaft engaged by the diaphragm, and valve operating means connected with said rock shaft.

6. In a dual control device for separators, an upright tank, a diaphragm carried by the tank and having the major portion of one side exposed to the interior of the tank for intimate contact with the liquid in the tank, a gas chamber on the opposite side of the diaphragm, means for conducting gas from the tank to the chamber, a gas outlet valve above the diaphragm and a liquid outlet valve below the diaphragm, a rock shaft, means for rocking said shaft engaged by the diaphragm, valve operating means connected with said rock shaft, a weight connected with the valve operating means for holding the liquid outlet valve closed and for resisting the displacement of the diaphragm by the liquid, and means connected in the valve operating means for permitting actuation of the rock shaft and the liquid outlet valve without operating the gas outlet valve.

7. In a dual control device for separators, an upright tank having an influent inlet above its bottom, a liquid outlet valve connected with the bottom portion of the tank, a gas outlet valve connected with the upper portion of the tank, a vertical diaphragm mounted at the side wall of the tank and having the major portion of one side entirely open to the interior of said tank, whereby the influent liquid may immediately contact said side of the diaphragm at different elevations and instantly displace the same, and valve operating means connected with the valves and also engaging with said diaphragm.

8. In a dual control device for separators, an upright tank having an influent inlet above its bottom, a liquid outlet valve connected with the bottom portion of the tank, a gas outlet valve connected with the upper portion of the tank, a vertical diaphragm mounted at the side wall of the tank and having the major portion of one side entirely open to the interior of said tank, whereby the influent liquid may immediately contact said side of the diaphragm at different elevations and instantly displace the same, valve operating means connected with the valves and also engaging with said diaphragm, a gas chamber on the opposite side of the diaphragm, and a conductor for conveying gas from the tank to said gas chamber.

9. In a dual control device for separators, an upright tank, a liquid outlet pipe leading from the tank, a liquid outlet valve connected to the liquid outlet pipe, a gas outlet pipe leading from the tank, a gas outlet valve connected to the gas outlet pipe, a diaphragm carried by the tank above the bottom thereof and having one side exposed to the liquid rising in the tank, a conductor for carrying gas from the tank to the opposite side of the diaphragm, a rod connecting the diaphragm with the liquid outlet valve, a rock shaft, a lever on the shaft, an operating connection between the lever and the gas outlet valve, a weight connected to the lever, and an operating connection between the diaphragm and the rock shaft for rocking the latter.

10. In a dual control device for separators, an upright tank, a liquid outlet pipe leading from the tank, a liquid outlet valve connected to the liquid outlet pipe, a gas outlet pipe leading from the tank, a gas outlet valve connected to the gas outlet pipe, a diaphragm carried by the tank above the bottom thereof and having one side exposed to the liquid rising in the tank, a conductor for carrying gas from the tank to the opposite side of the diaphragm, a slide bar connected with the diaphragm within the tank, and a rocker connected with and actuated by the slide bar and also connected with the liquid and gas outlet valves for operating the same.

ELMER R. WILLIAMS.